(12) United States Patent
Kuratani et al.

(10) Patent No.: US 10,199,623 B2
(45) Date of Patent: Feb. 5, 2019

(54) SEPARATOR FOR NONAQUEOUS SECONDARY BATTERY, AND NONAQUEOUS SECONDARY BATTERY

(71) Applicant: TEIJIN LIMITED, Osaka-shi, Osaka (JP)

(72) Inventors: Rika Kuratani, Osaka (JP); Satoshi Nishikawa, Osaka (JP)

(73) Assignee: TEIJIN LIMITED, Osaka (JP)

( * ) Notice: Subject to any disclaimer, the term of this patent is extended or adjusted under 35 U.S.C. 154(b) by 44 days.

(21) Appl. No.: 15/107,331

(22) PCT Filed: Jan. 29, 2015

(86) PCT No.: PCT/JP2015/052434
§ 371 (c)(1),
(2) Date: Jun. 22, 2016

(87) PCT Pub. No.: WO2015/115513
PCT Pub. Date: Aug. 6, 2015

(65) Prior Publication Data
US 2017/0005307 A1  Jan. 5, 2017

(30) Foreign Application Priority Data
Jan. 30, 2014  (JP) .................................. 2014-015692

(51) Int. Cl.
| | |
|---|---|
| *H01M 2/16* | (2006.01) |
| *H01M 10/0525* | (2010.01) |
| *B32B 7/12* | (2006.01) |
| *B32B 27/20* | (2006.01) |
| *B32B 27/30* | (2006.01) |

(52) U.S. Cl.
CPC .............. *H01M 2/166* (2013.01); *B32B 7/12* (2013.01); *B32B 27/20* (2013.01); *B32B 27/304* (2013.01); *H01M 2/16* (2013.01); *H01M 2/1686* (2013.01); *H01M 10/0525* (2013.01); *B32B 2262/106* (2013.01); *B32B 2457/10* (2013.01)

(58) Field of Classification Search
CPC .... H01M 10/0525; H01M 2/16; H01M 2/166; H01M 2/1686
See application file for complete search history.

(56) References Cited

U.S. PATENT DOCUMENTS

| | | | |
|---|---|---|---|
| 2003/0124429 A1 | 7/2003 | Okada et al. | |
| 2004/0086782 A1* | 5/2004 | Zhang ................. | H01M 2/1653 429/142 |
| 2013/0344396 A1* | 12/2013 | Bosnyak ............. | H01M 2/1653 429/307 |
| 2014/0248525 A1 | 9/2014 | Iwai et al. | |

FOREIGN PATENT DOCUMENTS

| | | | |
|---|---|---|---|
| CN | 1363124 A | 8/2002 | |
| JP | 2006-073221 A | 3/2006 | |
| JP | 2011-124104 A | 6/2011 | |
| JP | 2013-095488 A | 5/2013 | |
| JP | 2013-168373 A | 8/2013 | |
| JP | 2013168373 A * | 8/2013 | ............. H01G 11/52 |
| WO | 99/36981 A1 | 7/1999 | |
| WO | 01/63687 A1 | 8/2001 | |
| WO | 2013/058371 A1 | 4/2013 | |

OTHER PUBLICATIONS

International Carbon Black Association: Carbon Black User's Guide, 2016.*
Carbon Yogo Liten, first edition, Kabushiki Kaisha Agune Shofusha, Oct. 5, 2000, pp. 58, 59, 112 to 114.
JIS Tsukaikata Series Shinpan Plastic Zairyo Sentaku no Point second edition, new edition, second edition, Japanese Standards Association, Sep. 24, 2003, p. 444.
International Search Report of PCT/JP2015/052434 dated Mar. 24, 2015 [PCT/ISA/210].

* cited by examiner

*Primary Examiner* — Carlos Barcena
(74) *Attorney, Agent, or Firm* — Sughrue Mion, PLLC

(57) ABSTRACT

A separator for a nonaqueous secondary battery, including a porous substrate and an adhesive porous layer that is formed on at least one side of the porous substrate and contains a carbon material and a polyvinylidene fluoride resin. The separator has an initial static voltage of 0 V as measured in accordance with JIS L1094.

8 Claims, No Drawings

SEPARATOR FOR NONAQUEOUS SECONDARY BATTERY, AND NONAQUEOUS SECONDARY BATTERY

CROSS REFERENCE TO RELATED APPLICATIONS

This application is a National Stage of International Application No. PCT/JP2015/052434, filed Jan. 29, 2015 (claiming priority based on Japanese Patent Application No. 2014-015692, filed Jan. 30, 2014), the contents of which are incorporated herein by reference in their entirety.

TECHNICAL FIELD

The present invention relates to a separator for a nonaqueous secondary battery and also to a nonaqueous secondary battery.

BACKGROUND ART

Generally, a nonaqueous secondary battery, such as a lithium ion secondary battery, is composed of a positive electrode obtained by forming, on a current collector, an active material layer containing a positive electrode active material such as lithium cobalt oxide or a like lithium compound, a negative electrode obtained by forming, on a current collector, an active material layer containing a negative electrode active material such as graphite or a like carbon material capable of occluding/releasing lithium, a nonaqueous electrolytic solution obtained by dissolving an electrolyte such as $LiPF_6$ or a like lithium salt in an aprotic nonaqueous solvent, and a separator formed of a porous polymer membrane.

Nonaqueous secondary batteries have high energy densities. Because of this characteristic, they are widely spread as main power supplies for portable electronic devices, such as mobile phones and laptop computers. Further, in recent years, with the increasing global interest in the problem of global warming, they have come to be used for electric cars, hybrid cars, and the like for the purpose of reducing $CO_2$ emissions.

In ensuring the safety of a nonaqueous secondary battery, a separator plays an important role. Especially in terms of the shutdown function, a polyolefin microporous membrane containing a polyolefin as a main component is currently used. Incidentally, a shutdown function refers to the following function: when a battery is overheated, the polyolefin melts and closes pores in the microporous membrane to block the migration of lithium ions, thereby preventing further heat generation.

However, when a separator formed only of a polyolefin microporous membrane is exposed to a temperature higher than the temperature at which the shutdown function is developed, the entire separator may melt (so-called meltdown) to cause an internal short-circuit, thereby inducing rapid heat generation or explosion of the nonaqueous secondary battery.

In addition, a polyolefin resin has poor adhesion with other materials such as electrode materials. As a result, due to the insufficient adhesion between a polyolefin microporous membrane and electrodes, a gap may be formed between the electrodes and the separator, thereby causing a decrease in battery capacity or the degradation of cycle characteristics.

Thus, for the purpose of improving the adhesion between electrodes and a separator, it has been proposed to provide a porous layer containing an adhesive resin on one side or both sides of a polyolefin microporous membrane. In particular, as a technique for enhancing the adhesion between electrodes and a separator, a separator obtained by forming a porous layer containing a polyvinylidene fluoride resin as a main component on a polyolefin microporous membrane is known (e.g., PTL 1).

CITATION LIST

Patent Literature

PTL 1: WO 1999/036981

SUMMARY OF THE INVENTION

Technical Problem

However, a polyvinylidene fluoride resin is prone to electrostatic charging. Because of this nature, a polyvinylidene fluoride resin is characterized by having strong static electricity as a result of friction, separation, etc.

Accordingly, a separator for a nonaqueous secondary battery using a polyvinylidene fluoride resin as an adhesive porous layer may be electrostatically charged and become resistant to sliding, causing a problem in handleability in the process of battery production. Even when a static electricity eliminating step for eliminating static electricity from the separator is provided, it is difficult to eliminate static electricity through the entire battery production process.

Meanwhile, in recent years, the importance of repeatedly chargeable and dischargeable secondary batteries has been further increasing, and separators are also required to have characteristics that can withstand charge-discharge cycles. When a secondary battery is repeatedly subjected to charge-discharge cycles, the potential distribution inside the battery (particularly within the electrode surfaces) is biased, and, as a result, degradation proceeds. Particularly in the case where an adhering step is included in the battery production process, displacement or unevenness may occur at the site of adhesion, resulting in a problematic bias of the potential distribution. Therefore, a separator is also required to cancel the bias of the potential distribution and improve the cycle characteristics.

Thus, an object of the invention is, in a separator including an adhesive porous layer, to improve the handleability and cycle characteristics.

Solution to Problem

Specific means for solving the above problems are as follows.
<1> A separator for a nonaqueous secondary battery, including:
  a porous substrate; and
  an adhesive porous layer formed on at least one side of the porous substrate and containing a carbon material and a polyvinylidene fluoride resin,
  the separator having an initial static voltage of 0 V as measured in accordance with JIS L1094.
<2> The separator for a nonaqueous secondary battery according to <1> above, wherein the mass of the carbon material in the adhesive porous layer is 30% or more and 95% or less of the total mass of the adhesive porous layer.
<3> The separator for a nonaqueous secondary battery according to <1> or <2> above, wherein the carbon material is at least one member selected from the group consisting of acetylene black, carbon black, graphite, fullerene, graphene, carbon fibers, and carbon nanotubes.

<4> The separator for a nonaqueous secondary battery according to any one of <1> to <3> above, having a half-life of 0 second as measured in accordance with JIS L1094.

<5> A nonaqueous secondary battery using the separator for a nonaqueous secondary battery according to any one of <1> to <4> above.

Advantageous Effects of the Invention

According to the invention, in a separator including an adhesive porous layer, the handleability and cycle characteristics can be improved.

DESCRIPTION OF EMBODIMENTS

Hereinafter, embodiments of the invention will be described. Incidentally, these descriptions and examples are illustrative of the invention and do not limit the scope of the invention. In addition, a numerical range indicated using "to" herein shows a range including the numerical values before and after "to" as the minimum and maximum, respectively.

<Separator for Nonaqueous Secondary Battery>

The separator for a nonaqueous secondary battery of the invention is a separator for a nonaqueous secondary battery, including a porous substrate and an adhesive porous layer that is formed on at least one side of the porous substrate and contains a carbon material and a polyvinylidene fluoride resin. The separator has an initial static voltage of 0 V as measured in accordance with the half-life measurement method described in JIS L1094 (2008).

According to the invention like this, in a separator including an adhesive porous layer, the handleability and cycle characteristics can be improved.

An initial static voltage of 0 V indicates that the membrane surface does not have electrostatic chargeability, and static electricity is not generated due to friction or separation. When a carbon material having electrical conductivity is dispersed in an adhesive porous layer, the electrostatic chargeability of the membrane surface can be suppressed. When the separator for a nonaqueous secondary battery of the invention is used, the generation of static electricity in the battery production process is suppressed, resulting in improved handleability. Further, in a secondary battery using this separator, because of the electrical conductivity of the separator surface, the bias of the potential distribution within the electrode surfaces is canceled, resulting in improved cycle characteristics.

In the separator for a nonaqueous secondary battery of the invention, it is preferable that the half-life as measured in accordance with the half-life measurement method described in JIS L1094 (2008) is 0 second. When the half-life is 0 second, the generation of static electricity due to friction or separation is suppressed, resulting in improved handleability. In addition, because the separator surface has electrical conductivity, the bias of the potential distribution within the electrode surfaces is canceled, resulting in improved cycle characteristics.

In the invention, in terms of mechanical strength and of energy density as a battery, it is preferable that the thickness of the separator is 5 μm to 35 μm. In terms of adhesion to electrodes, mechanical strength, and ion permeability, it is preferable that the porosity of the separator is 30% to 60%. In terms of mechanical strength and membrane resistance, it is preferable that the Gurley value (JIS P8117) of the separator is 50 sec/100 cc to 800 sec/100 cc.

[Porous Substrate]

In the invention, a porous substrate means a substrate having pores or voids inside. Examples of such substrates include microporous membranes, porous sheets made of a fibrous material, such as nonwoven fabrics and paper-like sheets; and composite porous sheets including such a microporous membrane or porous sheet and at least one other porous layer laminated thereon. Incidentally, a microporous membrane means a membrane having a large number of micropores inside and configured such that the micropores are connected to each other, thereby allowing gas or liquid to pass from one side to the other side.

Materials to form the porous substrate may be any of organic materials and inorganic materials as long as they are electrically insulating materials.

In terms of imparting a shutdown function to the porous substrate, it is preferable that the material forming the porous substrate is a thermoplastic resin. Here, a shutdown function refers to the following function: when the battery temperature increases, a constituent material melts and closes pores of the porous substrate to block ion migration, thereby preventing the battery from thermal runaway. As the thermoplastic resin, a thermoplastic resin having a melting point of less than 200° C. is suitable, and polyolefins are particularly preferable.

As a porous substrate using a polyolefin, a polyolefin microporous membrane is preferable. As the polyolefin microporous membrane, a polyolefin microporous membrane having sufficient dynamic properties and ion permeability should be selected from those that have been applied to conventional separators for a nonaqueous secondary battery.

In terms of developing the shutdown function, it is preferable that the polyolefin microporous membrane contains polyethylene, and it is preferable that the polyethylene content is 95 mass % or more.

In addition, in terms of imparting heat resistance that prevents the membrane from easily breaking when exposed to high temperatures, a polyolefin microporous membrane containing polyethylene and polypropylene is preferable. An example of such a polyolefin microporous membrane is a microporous membrane in which both polyethylene and polypropylene are present in one layer. In terms of achieving both the shutdown function and heat resistance, it is preferable that the microporous membrane contains 95 mass % or more polyethylene and 5 mass % or less polypropylene. In addition, in terms of achieving both the shutdown function and heat resistance, it is also preferable that the polyolefin microporous membrane has a laminated structure including two or more layers, in which at least one layer contains polyethylene, while at least one layer contains polypropylene.

In the invention, in terms of obtaining excellent dynamic properties and internal resistance, it is preferable that the thickness of the porous substrate is within a range of 5 μm to 25 μm. In terms of obtaining suitable membrane resistance, it is preferable that the porosity of the porous substrate is 20% to 60%. In terms of preventing short circuits in a battery and obtaining sufficient ion permeability, it is preferable that the Gurley value (JIS P8117) of the porous substrate is within a range of 50 to 800 sec/100 cc.

[Adhesive Porous Layer]

In the invention, the adhesive porous layer is formed on at least one side of the porous substrate and contains a carbon material and a polyvinylidene fluoride resin. This adhesive porous layer has a large number of micropores inside and is configured such that the micropores are connected to each other, thereby allowing gas or liquid to pass from one side to the other side.

In addition, the adhesive porous layer in the invention is provided as the outermost layer of the separator on one side or both sides of the porous substrate, and can adhere to an electrode.

In terms of providing a battery with excellent cycle characteristics, it is preferable that the adhesive porous layer is present on both sides of the porous substrate rather than only one side. This is because when the adhesive porous layer is present on both sides of the porous substrate, both sides of the separator adhere well to the respective electrodes via the adhesive porous layer.

In the invention, in terms of ensuring adhesion to electrodes and high energy density, it is preferable that the thickness of the adhesive porous layer on one side of the porous substrate is 0.5 to 5 μm. In terms of ion permeability and adhesion, it is preferable that the porosity of the adhesive porous layer is 30 to 60%.

Incidentally, as necessary, additives including other inorganic compounds or organic compounds may be further added to the adhesive porous layer without interfering with the advantageous effects of the invention.

(Polyvinylidene Fluoride Resin)

Examples of polyvinylidene fluoride resins in the invention include a homopolymer of vinylidene fluoride (i.e., polyvinylidene fluoride), copolymers of vinylidene fluoride and another copolymerizable monomer (polyvinylidene fluoride copolymers), and mixtures thereof.

Examples of monomers copolymerizable with vinylidene fluoride include hexafluoropropylene, tetrafluoroethylene, trifluoroethylene, trichloroethylene, and vinyl fluoride. They may be used alone, or it is also possible to use two or more kinds.

A polyvinylidene fluoride resin can be synthesized by emulsion polymerization or suspension polymerization.

It is preferable that the polyvinylidene fluoride resin contains 95 mol % or more (more preferably 98 mol % or more) vinylidene fluoride as a structural unit. When 95 mol % or more vinylidene fluoride is contained, mechanical strength and heat resistance that can withstand pressurization and heating during battery production are more easily ensured. Meanwhile, when 0.1 to 0.2 mol % hexafluoropropylene is contained as a structural unit in the polyvinylidene fluoride resin, swelling in the electrolytic solution is easier, and also sufficient ion permeability can be ensured; therefore, this is preferable.

It is preferable that the mass average molecular weight of the polyvinylidene fluoride resin is 300,000 to 3,000,000. When the mass average molecular weight is 300,000 or more, dynamic properties that can withstand the treatment for bonding to electrodes can be ensured for the adhesive porous layer, and sufficient adhesion can be obtained. Meanwhile, when the mass average molecular weight is 3,000,000 or less, the viscosity of the coating liquid at the time of coating formation does not become too high, leading to excellent formability. The mass average molecular weight is more preferably within a range of 300,000 to 2,000,000, and still more preferably within a range of 500,000 to 1,500,000.

In the invention, the adhesive porous layer may contain other resins in addition to the polyvinylidene fluoride resin. Examples of other resins include styrene-butadiene copolymers, homopolymers and copolymers of vinyl nitriles such as acrylonitrile and methacrylonitrile, and polyethers such as polyethylene oxide and polypropylene oxide.

(Carbon Material)

In the invention, the carbon material is not particularly limited, but it is preferable to use, for example, at least one member selected from the group consisting of acetylene black, carbon black, graphite, fullerene, graphene, carbon fibers, and carbon nanotubes. In order to disperse a carbon material having electrical conductivity in the adhesive porous layer, it is preferable to use a carbon material having a shape that provides excellent dispersibility in the adhesive porous layer, and those in the form of powders, particles, and fibers are particularly preferable. In addition, in order to impart electrical conductivity to the separator surface and prevent electrostatic charging, it is necessary that the carbon material forms a connected structure with each other. Therefore, carbon fibers having a large aspect ratio and, of carbon black, acetylene black and ketjen black forming a chain structure are particularly preferable.

In the invention, it is preferable that the mass of the carbon material in the adhesive porous layer is 30% or more and 95% or less of the total mass of the adhesive porous layer. When the carbon material content is 30 mass % or more, the carbon material forms a connected structure with each other more easily, further improving the antistatic effect. From such a point of view, the carbon material content is more preferably 35 mass % or more, and still more preferably 40 mass % or more. Meanwhile, when the carbon material content is 95 mass % or less, the adhesive porous layer can be coated well without the carbon material settling in a coating liquid in the production method described below. From such a point of view, the carbon material content is more preferably 90 mass % or less, and still more preferably 80 mass % or less.

<Method for Producing Separator for Nonaqueous Secondary Battery>

The separator of the invention can be produced, for example, by a method in which a coating liquid containing a polyvinylidene fluoride resin and a carbon material is applied onto a porous substrate to form a coating layer, and then the polyvinylidene fluoride resin in the coating layer is solidified, thereby integrally forming an adhesive porous layer on the porous substrate.

The adhesive porous layer made of a polyvinylidene fluoride resin and a carbon material can be formed by the following method, for example.

First, a polyvinylidene fluoride resin is dissolved in a solvent, and then a carbon material is dispersed therein, thereby preparing a coating liquid. A porous substrate is coated with this coating liquid, followed by immersion in a suitable coagulation liquid, thereby solidifying the polyvinylidene fluoride resin while inducing phase separation. Through these steps, a layer having a porous structure made of a polyvinylidene fluoride resin and a carbon material is formed on the porous substrate. Subsequently, washing with water is performed, followed by drying, thereby removing the coagulation liquid from the layer having a porous structure.

The coating method suitable for the invention will be described in detail hereinafter.

As a solvent to dissolve a polyvinylidene fluoride resin (hereinafter sometimes referred to as "good solvent") used for the preparation of a coating liquid, it is preferable to use a polar amide solvent such as N-methyl-2-pyrrolidone (NMP), dimethylacetamide, or dimethylformamide.

In terms of forming an excellent porous structure, it is preferable to mix a phase separation agent that induces phase separation with the good solvent. Examples of phase separation agents include water, methanol, ethanol, propyl alcohol, butyl alcohol, butanediol, ethylene glycol, propylene glycol, and tripropylene glycol. It is preferable that the phase separation agent is added within a range where viscosity suitable for coating can be ensured.

In terms of forming an excellent porous structure, it is preferable that the solvent is a mixed solvent containing 60 mass % or more a good solvent and 5 mass % to 40 mass % or less a phase separation agent.

For coating a porous substrate with the coating liquid, conventional coating methods, such as a Mayer bar, a die coater, a reverse roll coater, and a gravure coater, are applicable. In the case where an adhesive porous layer is formed on both sides of the porous substrate, in terms of productivity, it is preferable that both sides of the substrate are simultaneously coated with the coating liquid.

In addition to the coating methods described above, the adhesive porous layer can also be produced by the following dry method. Here, a dry method is a method in which a porous substrate is coated with a coating liquid containing a polyvinylidene fluoride resin, a carbon material, and a solvent, and then the resulting coating layer is dried to volatilize the solvent away, thereby giving a porous layer. However, as compared with a wet coating method, a dry coating method tends to give a dense coating layer. Accordingly, in terms of obtaining an excellent porous structure, wet coating methods are more preferable.

The separator of the invention can also be produced by a method in which an adhesive porous layer is formed as an independent sheet, then the adhesive porous layer is placed on a porous substrate, and they are composited by thermocompression bonding or using an adhesive. The method for producing an adhesive porous layer as an independent sheet may be a method in which a coating liquid containing a polyvinylidene fluoride resin and a carbon material is applied onto a release sheet, then an adhesive porous layer is formed by the wet coating method or dry coating method described above, and the adhesive porous layer is separated from the release sheet.

<Nonaqueous Secondary Battery>

The nonaqueous secondary battery of the invention is a nonaqueous secondary battery whose electromotive force is obtained by lithium doping/dedoping, and includes a positive electrode, a negative electrode, and the separator for a nonaqueous secondary battery of the invention described above. The nonaqueous secondary battery is configured such that a battery element, which includes a structure having the negative electrode and the positive electrode facing each other via the separator and impregnated with an electrolytic solution, is enclosed in an outer casing material.

The nonaqueous secondary battery of the invention is suitable for a nonaqueous electrolyte secondary battery, particularly a lithium ion secondary battery.

Incidentally, doping means occlusion, support, adsorption, or intercalation, and refers to the phenomenon that lithium ions enter the active material of an electrode such as a positive electrode.

The nonaqueous secondary battery of the invention includes, as a separator, the separator for a nonaqueous secondary battery of the invention described above, and thus is excellent in handleability during the battery production process and also has excellent cycle characteristics.

The positive electrode may be configured such that an active material layer containing a positive electrode active material and a binder resin is formed on a current collector. The active material layer may further contain an electrically conductive auxiliary.

Examples of positive electrode active materials include materials capable of occluding and releasing lithium, such as lithium cobalt oxide, lithium nickel oxide, lithium manganese oxide, and like lithium-transition metal composite oxides. They may be used alone, or it is also possible to use two or more kinds together.

The binder resin is not particularly limited as long as it is a material stable in the solvent and electrolytic solution used at the time of battery production and other materials used at the time of using the battery. Specific examples thereof include polyvinylidene fluoride and polytetrafluoroethylene.

Examples of electrically conductive auxiliaries include carbon materials such as fine particles of graphite including natural graphite, artificial graphite, etc., and carbon black including acetylene black, etc.

Examples of current collectors include aluminum foils, titanium foils, and stainless steel foils having a thickness of 5 µm to 20 µm.

The negative electrode may be configured such that an active material layer containing a negative electrode active material and a binder resin is formed on a current collector. The active material layer may further contain an electrically conductive auxiliary. Examples of negative electrode active materials include materials capable of electrochemically storing lithium. Specific examples thereof include carbon materials; metal oxide materials such as tin oxide and silicon oxide, lithium metal; and various lithium alloys. These negative electrode active materials may be used alone, and it is also possible to use a mixture of two or more kinds.

The binder resin is not particularly limited as long as it is a material stable in the solvent and electrolytic solution used at the time of electrode production and other materials used at the time of using the battery. Specific examples thereof include polyvinylidene fluoride resins and styrene-butadiene rubber.

Examples of electrically conductive auxiliaries include carbon materials such as acetylene black, ketjen black, and graphite powder.

Examples of current collectors include copper foils, nickel foils, and stainless steel foils having a thickness of 5 µm to 20 µm.

In addition, instead of such a negative electrode, a metal lithium foil may also be used as the negative electrode.

The electrolytic solution is a solution obtained by dissolving a lithium salt in a nonaqueous solvent.

Examples of lithium salts include $LiPF_6$, $LiBF_4$, and $LiClO_4$. Among them, comprehensively considering the solubility in a nonaqueous solvent, the charge-discharge characteristics, output characteristics, and cycle characteristics as a secondary battery, etc., $LiPF_6$ is preferable.

Examples of nonaqueous solvents include cyclic carbonates such as ethylene carbonate, propylene carbonate, fluoroethylene carbonate, and difluoroethylene carbonate; linear carbonates such as dimethyl carbonate, diethyl carbonate, ethyl methyl carbonate, and fluorine substitutions thereof; and cyclic esters such as γ-butyrolactone and γ-valerolactone. They may be used alone or as a mixture.

As the electrolytic solution, one obtained by mixing a cyclic carbonate and a linear carbonate in a mass ratio (cyclic carbonate/linear carbonate) of 20/80 to 40/60 and dissolving a lithium salt therein at 0.5 M to 1.5 M is preferable.

Examples of outer casing materials include metal cans and packs formed from an aluminum laminate film. The shape of batteries may be prismatic, cylindrical, coin-type, etc., and the separator for a nonaqueous secondary battery of the invention is suitable for any shape.

The separator for a nonaqueous secondary battery of the invention has excellent adhesion to electrodes. Accordingly, even when external impact is applied, or the electrodes expand/contract during charge-discharge, a gap is less likely to be formed between the electrodes and the separator. The separator is thus suitable for a battery whose outer casing material is a pack formed from an aluminum laminate film.

The nonaqueous secondary battery of the invention can be produced, for example, by impregnating a laminate including the separator of the invention disposed between a positive electrode and a negative electrode with an electrolytic solution, then placing the same in an outer casing material (e.g., pack formed from an aluminum laminate film), and pressing the laminate through the outer casing material.

According to the production method described above, the electrodes and the separator can adhere well to each other, making it possible to obtain a nonaqueous secondary battery having an excellent cycle life. In addition, because of the excellent adhesion between the electrodes and the separator, the battery also has excellent safety.

The separator for a nonaqueous secondary battery of the invention can adhere to electrodes by stacking. Therefore, in battery production, the above pressing is not an indispensable step. However, in order to enhance the adhesion between the electrodes and the separator, it is preferable to perform pressing. Further, in order to enhance the adhesion between the electrodes and the separator, it is preferable that the pressing is pressing with heating (heat pressing).

As a method for disposing the separator between a positive electrode and a negative electrode, it is also possible that a positive electrode, the separator, a negative electrode, and a separator are staked in this order and rolled in the length direction.

EXAMPLES

Hereinafter, examples will be described. The scope of the invention should not be construed as being limited to the following specific examples.

[Measurement Methods]

The measurement methods applied in the examples of the invention and comparative examples are as follows.

(Thickness)

Measurement was performed using a contact thickness meter (LITEMATIC manufactured by Mitutoyo Corporation). A cylindrical terminal having a diameter of 5 mm was used as a measuring terminal, and it was adjusted to apply a load of 7 g during the measurement.

(Initial Static Voltage and Half-Life)

In accordance with the half-life measurement method described in JIS L 1094 (2008), the initial static voltage and its half-life were measured using Static Honestmeter H-0110 (manufactured by Shishido Electrostatic, Ltd.). The measurement was performed in a test room at a temperature of 22° C. and a humidity of 18%. The initial static voltage is obtained from the initial static voltage in the measurement results (the voltage after a measurement time of 0 second), and the half-life is obtained from the time taken for the static voltage to reach ½ the initial static voltage.

(Handleability Test)

A separator was spread on a horizontal place. The surface was rubbed with a stick made of metal or resin back and forth about 10 times, and then immediately the stick was vertically lifted. Separators that clung to the stick or broken in the surface at this time were rated as having poor handleability (x), while separators that showed no change were rated as having excellent handleability (○).

(Cycle Test)

Lithium ion batteries using the separators for a nonaqueous secondary battery of the examples and comparative examples were produced as follows and subjected to a cycle test.

(1) Production of Positive Electrode

A lithium cobalt oxide powder as a positive electrode active material, acetylene black as an electrically conductive auxiliary, and polyvinylidene fluoride as a binder were dissolved in NMP to concentrations of 89.5 mass %, 4.5 mass %, and 6 mass %, respectively, and stirred in a double-arm mixer to give a positive electrode slurry. The slurry for a positive electrode was applied to an aluminum foil having a thickness of 20 µm as a positive electrode current collector, and the obtained coating film was dried and pressed, thereby giving a positive electrode having a positive electrode active material layer.

(2) Production of Negative Electrode 300 g of artificial graphite as a negative electrode active material, 7.5 g of an aqueous dispersion containing 40 mass % a modified styrene-butadiene copolymer as a binder, 3 g of carboxymethyl cellulose as a thickener, and an appropriate amount of water were stirred in a double-arm mixer to give a slurry for a negative electrode. The slurry for a negative electrode was applied to a copper foil having a thickness of 10 µm as a negative electrode current collector, dried, and then pressed, thereby giving a negative electrode having a negative electrode active material layer.

(3) Production of Battery

A lead tab was welded to the positive electrode and the negative electrode. These positive and negative electrodes were joined together via a separator, impregnated with an electrolytic solution, and enclosed in an aluminum pack using a vacuum sealer. Here, as the electrolytic solution, 1 M LiPF$_6$ ethylene carbonate/ethylmethyl carbonate (=30/70 mass ratio) was used.

(4) Cycle Test

The cycle test was performed using the nonaqueous secondary batteries produced above. At normal temperature (25° C.), constant current/constant voltage charge was performed at a constant current of 1 C and a constant current of a voltage of 4.2 V (total charge time: 4 hours), followed by constant current discharge at 1 C (final discharge voltage: 2.75 V); this is defined as one cycle. Charge-discharge was repeated for 100 cycles under the above conditions, and capacity retention (=electric capacity in the $100^{th}$ cycle/electric capacity in the first cycle×100%) was calculated.

Example 1

As a polyvinylidene fluoride resin, KF Polymer #9300 manufactured by Kureha Kagaku Kogyo and KYNER 2801 manufactured by ARKEMA were mixed in a mass ratio of 50/50 and used. As acetylene black to serve as a carbon material, DENKA BLACK manufactured by Denki Kagaku Kogyo was used. The polyvinylidene fluoride resin was dissolved at 5 mass % in a mixed solvent of dimethylacetamide/tripropylene glycol (=8/2 mass ratio), and acetylene black was dispersed such that the polyvinylidene fluoride resin/acetylene black=70/30 mass ratio, thereby giving a coating liquid. Both sides of a polyethylene microporous membrane having a thickness of 9 µm, a Gurley value of 160 sec/100 cc, and a porosity of 43% (CG0901: manufactured by Toray Industries) were coated with the same amount of this coating liquid, followed by immersion in a coagulation liquid (40° C.) containing water/dimethylacetamide/tripropylene glycol (=62.5/30/7.5 mass ratio) to cause solidification. It was then washed with water and dried, thereby giving a separator for a nonaqueous secondary battery according to the invention, including a polyolefinic microporous membrane and, on each side thereof, an adhesive porous layer made of a polyvinylidene fluoride resin having acetylene black dispersed therein. With respect to this separator, Table 1 shows the composition of the adhesive porous layer and the thickness of the separator, and Table 2 shows the measurement results of initial static voltage, half-life, handleability, and cycle characteristics. The separators of the following examples and comparative examples are also shown in Tables 1 and 2.

Examples 2 to 4

Separators for a nonaqueous secondary battery according to the invention were obtained in the same manner as in Example 1, except that acetylene black was adjusted such that the mass ratio relative to the polyvinylidene fluoride resin was as shown in Table 1.

Example 5

A separator for a nonaqueous secondary battery according to the invention was obtained in the same manner as in Example 1, except that carbon fibers were used as a carbon material, and the polyvinylidene fluoride resin/carbon fibers=70/30 mass ratio.

Comparative Example 1

A separator for a nonaqueous secondary battery was obtained in the same manner as in Example 1, except that a carbon material was not dispersed.

Comparative Example 2

A separator for a nonaqueous secondary battery was obtained in the same manner as in Example 1, except that a carbon powder having an average diameter of 1 μm was used as a carbon material, and the carbon powder and an alumina powder having an average diameter of 0.01 μm were dispersed such that the mass ratio relative to the polyvinylidene fluoride resin was as shown in Table 1.

Comparative Example 3

A separator for a nonaqueous secondary battery was obtained in the same manner as in Example 1, except that a carbon powder having an average diameter of 0.5 μm was used as a carbon material, and the carbon powder and a polymethyl methacrylate powder were dispersed such that the mass ratio relative to the polyvinylidene fluoride resin was as shown in Table 1.

Comparative Example 4

A separator for a nonaqueous secondary battery was obtained in the same manner as in Example 1, except that acetylene black was dispersed such that the mass ratio relative to the polyvinylidene fluoride resin was as shown in Table 1.

TABLE 1

|  | Adhesive Porous Layer | | PVdF/Carbon | Thickness |
|---|---|---|---|---|
|  | Carbon Material | Other Fillers | Material/Other Fillers Mass Ratio | (μm) |
| Example 1 | Acetylene black | — | 70/30/0 | 16 |
| Example 2 | Acetylene black | — | 60/40/0 | 21 |
| Example 3 | Acetylene black | — | 30/70/0 | 26 |
| Example 4 | Acetylene black | — | 5/95/0 | 30 |
| Example 5 | Carbon fiber | — | 70/30/0 | 24 |
| Comparative Example 1 | — | — | 100/0/0 | 12 |
| Comparative Example 2 | Carbon powder | Alumina powder | 50/5/45 | 25 |
| Comparative Example 3 | Carbon powder | Polymethyl methacrylate powder | 50/25/25 | 29 |
| Comparative Example 4 | Acetylene black | — | 3/97/0 | — |

TABLE 2

|  | Static Electricity Initial Static Voltage (V) | Static Electricity Half-Life (sec) | Handleability Test Results | Charge-Discharge Cycle Test Results |
|---|---|---|---|---|
| Example 1 | 0 | 0 | ○ | 92% |
| Example 2 | 0 | 0 | ○ | 95% |
| Example 3 | 0 | 0 | ○ | 93% |
| Example 4 | 0 | 0 | ○ | 92% |
| Example 5 | 0 | 0 | ○ | 94% |
| Comparative Example 1 | 2.15 | 890 | X | 85% |
| Comparative Example 2 | 1.98 | 634 | X | 87% |
| Comparative Example 3 | 1.39 | 368 | X | 88% |
| Comparative Example 4 | — | — | — | — |

* With respect to the handleability test results, ○ means excellent, while X means poor.

[Explanation of Initial Static Voltage Measurement Results]

In Examples 1 to 5, the initial static voltage is 0 V, and the static half-life is 0 second. Thus, electrostatic chargeability is not observed at all. Meanwhile, in Comparative Examples 1 to 3, the initial static voltage is 1.39 to 2.15 V, 368 to 890 seconds. Thus, they have strong electrostatic chargeability. Although a coating liquid was produced under the conditions of Comparative Example 4, because the mass ratio of acetylene black was high, the particles settled, making it impossible to coat the microporous membrane. From the above, it is considered that among battery separators having an adhesive porous membrane layer, in the battery separators in which the adhesive porous membrane layer contained a polyvinylidene fluoride resin and a carbon material, and the initial static voltage was 0 V, the carbon material formed a connected structure with each other in the adhesive porous membrane layer, whereby electrostatic chargeability was no longer observed.

[Explanation of Handleability Test Results]

Handleability was excellent in Examples 1 to 5. Meanwhile, in Comparative Examples 1 to 3, the separators clung to the stick, and the handleability was poor. In Comparative Examples 1 to 3, strong electrostatic chargeability has been shown from the initial static voltage measurement results, and it is considered that as a result of rubbing the separator surface with a stick made of metal or resin, the surface was electrostatically charged, causing the cling to the stick. The separators of Examples 1 to 5 do not have electrostatic chargeability. Accordingly, the separator surface is not electrostatically charged even when rubbed with a stick made of metal or resin.

[Explanation of Cycle Test Results]

In Examples 1 to 5, the capacity retention after 100 charge-discharge cycles was 92 to 95%. Meanwhile, in Comparative Examples 1 to 3, the capacity retention was 85 to 88%. This shows that in a lithium ion battery produced using a battery separator in which the adhesive porous membrane layer contains a polyvinylidene fluoride resin and a carbon material, and the initial static voltage is 0 V, the potential distribution is uniformized in the adhesive porous membrane layer, resulting in improved cycle characteristics.

The invention claimed is:

1. A separator for a nonaqueous secondary battery, comprising:
    a porous substrate; and
    an adhesive porous layer formed as an outermost layer of the separator on at least one side of the porous substrate and containing a carbon material and a polyvinylidene fluoride resin,
    the separator having an initial static voltage of 0 V as measured in accordance with JIS L1094, wherein
    the mass of the carbon material in the adhesive porous layer is more than 40% and 95% or less of the total mass of the adhesive porous layer, and
    the carbon material is at least one member selected from the group consisting of acetylene black, ketjen black, fullerene, graphene, and carbon fibers.

2. The separator for a nonaqueous secondary battery according to claim 1, wherein the mass of the carbon material in the adhesive porous layer is 70% or more and 95% or less of the total mass of the adhesive porous layer.

3. The separator for a nonaqueous secondary battery according to claim 2, having a half-life of 0 second as measured in accordance with JIS L1094.

4. The separator for a nonaqueous secondary battery according to claim 1, having a half-life of 0 second as measured in accordance with JIS L1094.

5. A nonaqueous secondary battery comprising the separator for a nonaqueous secondary battery according to claim 1.

6. A nonaqueous secondary battery comprising the separator for a nonaqueous secondary battery according to claim 2.

7. A nonaqueous secondary battery comprising the separator for a nonaqueous secondary battery according to claim 4.

8. A nonaqueous secondary battery comprising the separator for a nonaqueous secondary battery according to claim 3.

* * * * *